United States Patent
Spary

[19]

[11] Patent Number: 6,135,490
[45] Date of Patent: Oct. 24, 2000

[54] SIDE AIR BAG WITH TRACTION ELEMENTS

[75] Inventor: Anton Spary, Ruppertshofen, Germany

[73] Assignee: TRW Occupant Restraint Systems GmbH, Alfdorf, Germany

[21] Appl. No.: 09/037,363

[22] Filed: Mar. 10, 1998

[30] Foreign Application Priority Data

Mar. 18, 1997 [DE] Germany ............... 297 04 975 U

[51] Int. Cl.[7] .................................................. B60R 21/22
[52] U.S. Cl. ............................ 280/730.2; 280/743.1; 280/743.2
[58] Field of Search ..................... 280/743.1, 743.2, 280/730.2; 160/370.23

[56] References Cited

U.S. PATENT DOCUMENTS

| | | | |
|---|---|---|---|
| 4,932,711 | 6/1990 | Goebel | 160/370.23 |
| 5,105,867 | 4/1992 | Coslett | 160/370.23 |
| 5,333,898 | 8/1994 | Stutz | 280/730.2 |
| 5,788,270 | 8/1998 | Haland et al. | 280/730.2 |
| 5,865,465 | 2/1999 | Bauer et al. | 280/743.1 |
| 5,899,486 | 5/1999 | Ibe | 280/728.2 |
| 5,899,489 | 5/1999 | Jost | 280/730.2 |

*Primary Examiner*—J. J. Swann
*Assistant Examiner*—James S. McClellan
*Attorney, Agent, or Firm*—Tarolli, Sundheim, Covell, Tummino & Szabo L.L.P.

[57] ABSTRACT

A gas bag has at least one inflatable chamber formed from textile wall pieces, and a seam edging this chamber. To considerably facilitate the stowing or folding of the gas bag in a housing or the like, guide elements in at least one seam region are provided for a traction means arranged parallel to the longitudinal direction of the seam, and the traction means is secured on an end region of the seam.

9 Claims, 2 Drawing Sheets

SIDE AIR BAG WITH TRACTION ELEMENTS

FIELD OF THE INVENTION

The invention relates to a gas bag with at least one inflatable chamber, formed from textile wall pieces, and with a seam edging this chamber.

BACKGROUND OF THE INVENTION

The inflatable gas bag of a vehicle occupant protective system is stored in the vehicle in folded state behind a covering or casing. The folding of a gas bag must ensure that it can freely unfold on inflation. This requirement, in particular in the case of larger gas bags of irregular shape, leads to complex folding processes, the automation of which encounters difficulties.

SUMMARY OF THE INVENTION

Through the invention, a gas bag is made available, which is equipped with an aid which considerably facilitates the stowing unfolding in a housing or the like. According to the invention, in at least one seam region of the gas bag, guide elements are provided for a traction means which is arranged parallel to the longitudinal direction of the seam; this traction means is fastened to an end region of the seam. By exerting traction onto the free end of the traction means, the textile wall pieces of the gas bag can be drawn into a housing, holding compartment or the like, in which they are gathered or folded. In so doing, the base of the housing forms a support for the part of the gas bag on which the traction means is fastened. This construction of the gas bag is particularly advantageous when it has an elongated shape in the folded state. This is the case in so-called A-C side air bags, i.e. inflatable protective cushions which extend from the A column via the B column to the C column and in the inflated state cover the side windows of the vehicle. With such an embodiment of the gas bag, several traction means are distributed over its length. By simultaneous exerting of traction on the free ends of the traction means, the elongated gas bag is drawn into a holding housing which is U-shaped in cross-section, in which it is folded at the same time.

A controlled folding in the manner of a gathering is achieved by several slits arranged in the seam transversely to the longitudinal direction of the traction means, through which slits the traction means is guided on alternate sides of the seam. After the textile wall of the gas bag is transferred into the folded state through the exerting of traction on the traction means, this state can be ensured during mounting in the vehicle in that the traction means, which is under tensile stress, is secured, for example hooked, on the housing receiving the folded gas bag.

BRIEF DESCRIPTION OF THE DRAWINGS

Further features and advantages of the invention will emerge from the following description of several embodiments and from the drawing, to which reference is made. In the drawing.

DESCRIPTION OF THE PREFERRED EMBODIMENT

Figure 1:
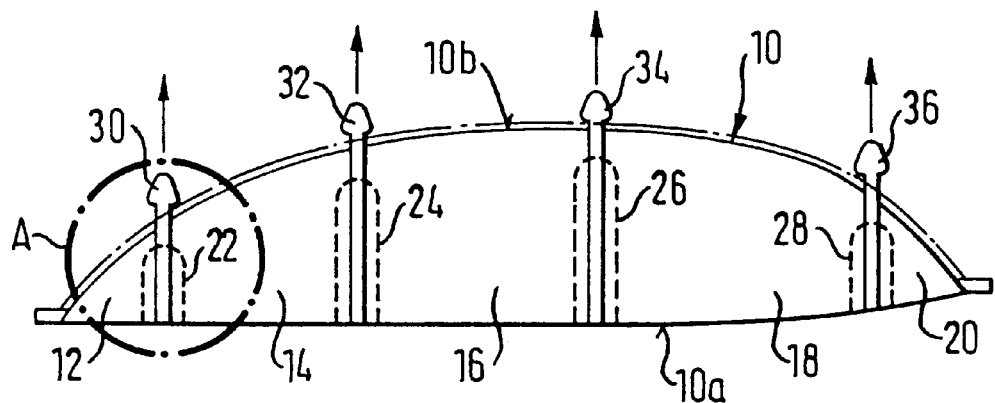
FIG. 1 shows a gas bag, illustrated spread out flat, of a vehicle occupant protection system.

The gas bag 10 illustrated in FIG. 1 in the state when spread out flat, extends in the vehicle from the A column to the C column and covers the side windows and also the B column of the vehicle. Its inflatable chamber consists of several chamber compartments 12, 14, 16, 18, 20 which are in flow connection with each other. Adjacent chamber compartments are in each case separated by a seam 22, 24, 26, 28, which extends starting from the lower edge 10a of the gas bag up to close to the upper edge 10b, but ends shortly before the latter, so that between the end of each seam and the upper edge 10b of the gas bag 10, a connecting channel remains between adjacent chamber compartments. The seam 22, 24, 26, 28 can be sewn, glued or formed by interweaving the two textile wall pieces of the gas bag lying one over the other.

On each seam 22, 24, 26, 28, close to the lower edge 10a of the gas bag 10, a traction band 30, 32, 34, 36 is fastened. Each traction band 30, 32, 34, 36 extends in longitudinal direction of the associated seam 22, 24, 26 or 28. The free ends of the traction bands 30, 32, 34, 36 project over the upper edge 10b of the gas bag 10. They are provided with a triangular widening, which facilitates the application of a tensile stress onto the corresponding traction band.

Figure 3:
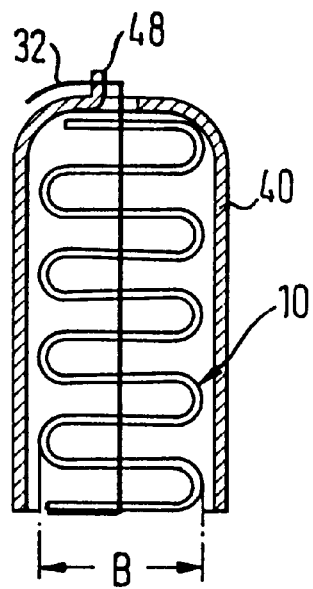
FIG. 3 shows a cross-section through the folded gas bag and a housing receiving the latter.

FIG. 3 shows a housing 40 which is U-shaped in cross-section, which serves to receive the folded gas bag 10 and extends over the entire length of the gas bag. It is integrated into the roof construction of the vehicle and has an elongated shape, curved in accordance with the upper edging of the side windows.

Figure 4:
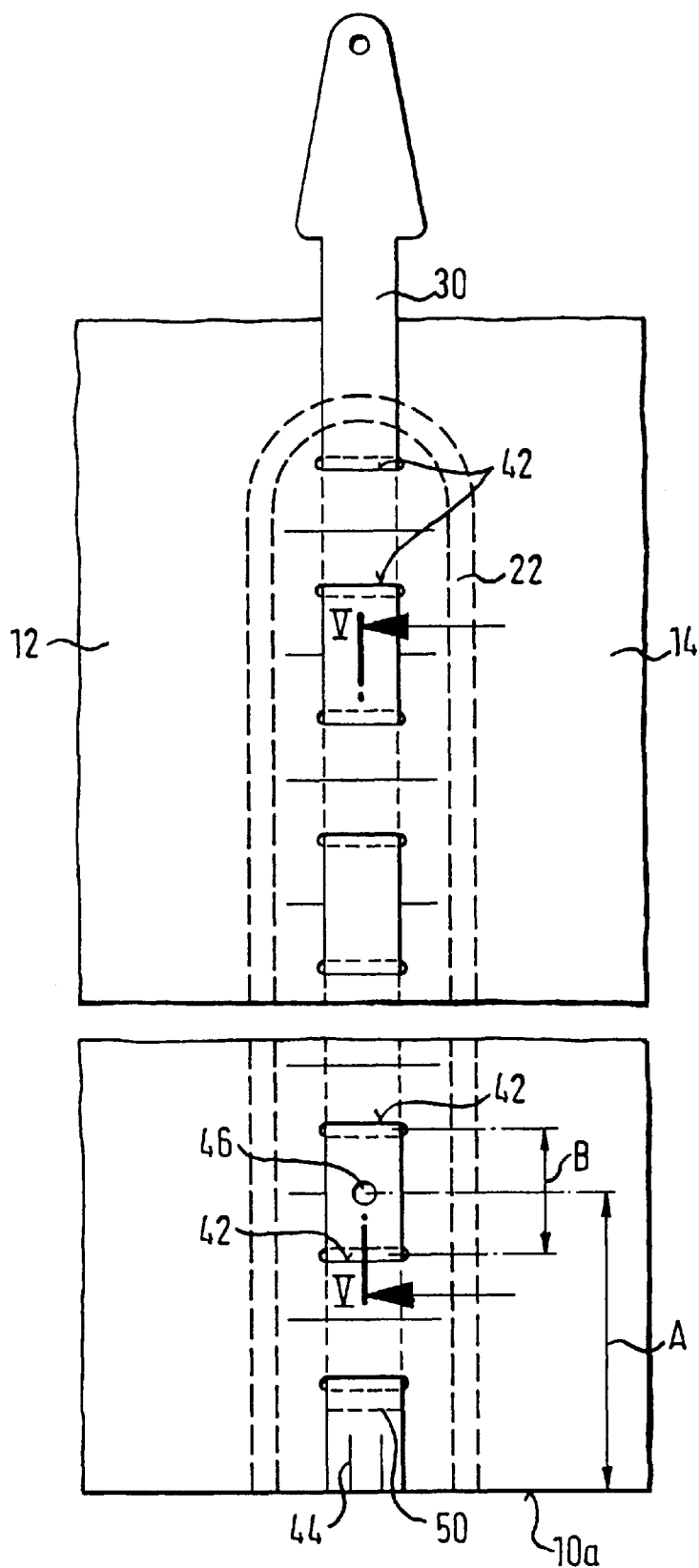
FIG. 4 shows on a larger scale the detail designated by A in FIG. 1.
Figure 5:
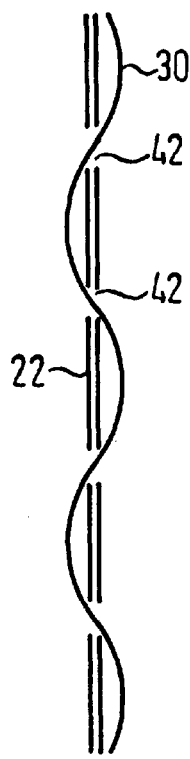
FIG. 5 shows a sectional view along the line V—V in FIG. 4.

FIGS. 4 and 5 show details of the construction of the seam 22 and of the traction band 30.

The seam 22, delimiting the chamber compartments 12, 14 from each other, like all other seams 24, 26, 28, is provided with a plurality of slits 42, through which the traction band 30 extends on alternate sides of the seam. The slits 42 are oriented transversely to the longitudinal direction of the seam 22 and are spaced uniformly over its entire length. One end of the traction band 30 is secured, for example sewn, to the seam 22 at 44 close to the lower edge 10a of the gas bag 10.

Figure 2:
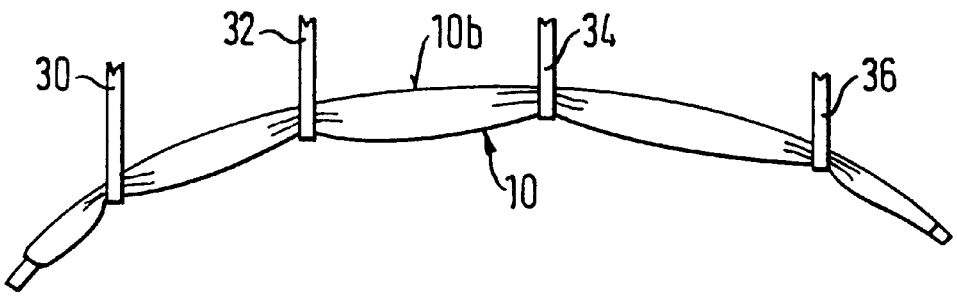
FIG. 2 shows the gas bag according to FIG. 1 in the folded state.

In order to transfer the gas bag 10, shown spread out flat in FIG. 1, into the gathered or folded state shown in FIG. 2, at the same time a traction is exerted on the free ends of the traction bands 30 to 36 in the direction of the arrows drawn in FIG. 1, whilst the upper edge 10b of the gas bag finds a support on the base of the housing 40. As can be seen from FIG. 3, the traction bands 30 to 36 are guided in each case outwards through a slit on the base of the housing 40. As the traction bands 30 to 36 are guided through the slits 42 and run on alternate sides of the gas bag, through the exerting of traction on the traction bands, a controlled folding of the gas bag is brought about. The spacing between two adjacent slits 42 is designated by B in FIG. 4; it determines the width B of the folded gas bag 10 inside the housing 40, as can be shown by simple geometric considerations.

In the spacing A from the lower edge 10a of the gas bag 10, each traction band 30 to 36 is provided with a hole 46. At this hole 46 the respective traction band is hooked on a bent-out lug 48 on the outer side of the housing 40. The traction bands 30 to 36 thus remain under tension in order to ensure the folded state of the gas bag inside the housing 40 during mounting in the vehicle. On completion of mounting, the open end of the housing 40, which is U-shaped in cross-section, is closed by a covering which also holds the gas bag inside the housing. The traction bands 30 to 36 can now be released from the projecting lugs 48 on the base of the housing 40, so that on activation of the gas bag they do not impede its unfolding. Alternatively, each traction band 30 to 36 is provided with a nominal tear line 50 running transversely, on which it tears under the expension pressure of the unfolding gas bag. The use of the invention is particularly advantageous in gas bags which have an elongated shape in the folded state. However, also in differently shaped gas bags, also those with only one single continuous chamber, the invention can be used advantageously, in order to bring about a controlled folding of the gas bag in the simplest manner.

What is claimed is:

1. Apparatus comprising:
   a gas bag with at least one inflatable chamber formed from at least one textile wall piece, said gas bag including a seam edging said chamber;
   a housing for receiving said gas bag in a folded state;
   a traction means arranged parallel to a longitudinal direction of said seam and being fastened on an end region of said seam; and
   guide elements on said gas bag for guiding said traction means in at least one seam region of said gas bag;
   said gas bag being transferred into said folded state in said housing through the exerting of force on a free end of said traction means.

2. A gas bag according to claim 1, wherein the gas bag has an elongated shape in said folded state and its folding is brought about by the exerting of traction on several traction means distributed over its length.

3. A gas bag according to claim 2, wherein the inflatable chamber is divided by several seam strips into individual chamber compartments and one traction means is arranged along each of said seam strips.

4. A gas bag according to claim 1, wherein said guide elements are formed by slits arranged transversely to said longitudinal direction of said seam in the latter, through which slits said traction means extends on alternate sides of the wall pieces of the gas bag.

5. A gas bag according to claim 1, wherein a detent-, locking or holding element is provided on said traction means, which engages on a corresponding counter element of said housing and holds said traction means in a tensioned state.

6. A gas bag according to claim 5, wherein said traction means is provided with a nominal tear line oriented transversely to a longitudinal direction of said traction means.

7. Apparatus as defined in claim 1, wherein said housing engages said gas bag in a region opposite said end region of said seam when said gas bag is transferred into said folded state in said housing.

8. Apparatus comprising:
   a gas bag having at least one inflatable chamber, said gas bag including an upper edge and a lower edge spaced apart from said upper edge;
   a housing for receiving said gas bag in a folded state; and
   traction means having a first end connected to said gas bag near said lower edge of said gas bag, said traction means extending through guide elements on said gas bag and extending along alternate sides of said gas bag;
   said gas bag being transferred into said folded state in said housing through the exerting of a force on a second end of said traction means opposite said first end.

9. Apparatus as defined in claim 8, wherein said upper edge of said gas bag engages said housing, said lower edge of said gas bag being drawn into said housing towards said upper edge when said gas bag is transferred into said folded state.

* * * * *